(12) United States Patent
Sasaki

(10) Patent No.: US 7,114,007 B2
(45) Date of Patent: Sep. 26, 2006

(54) DATA CONVERSION SYSTEM AND DATA CONVERSION METHOD FOR CONVERTING WEB CONTENT FOR PORTABLE DEVICES BASED ON THE CONTRAINTS OF THE PORTABLE DEVICE

(75) Inventor: Hiroshi Sasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 646 days.

(21) Appl. No.: 09/776,861

(22) Filed: Feb. 6, 2001

(65) Prior Publication Data

US 2001/0013070 A1 Aug. 9, 2001

(30) Foreign Application Priority Data

Feb. 9, 2000 (JP) ............................ 2000-031348

(51) Int. Cl.
*G06F 15/16* (2006.01)
*G06F 15/167* (2006.01)

(52) U.S. Cl. .................. 709/246; 709/204; 709/217; 709/203; 709/230

(58) Field of Classification Search ............... 709/246, 709/230, 204, 217–231, 200–203; 719/310, 719/315–328; 718/100, 104; 726/12, 15; 710/11; 713/151; 714/39
See application file for complete search history.

(56) References Cited

U.S. PATENT DOCUMENTS

| | | | |
|---|---|---|---|
| 5,727,159 A | 3/1998 | Kikinis | |
| 6,138,156 A * | 10/2000 | Fletcher et al. ............. | 709/224 |
| 6,185,208 B1 * | 2/2001 | Liao ............................ | 370/392 |
| 6,311,215 B1 * | 10/2001 | Bakshi et al. ............... | 709/221 |
| 6,334,126 B1 | 12/2001 | Nagatomo et al. | |
| 6,421,733 B1 * | 7/2002 | Tso et al. .................... | 709/246 |
| 6,457,030 B1 * | 9/2002 | Adams et al. ............... | 715/523 |
| 6,473,794 B1 * | 10/2002 | Guheen et al. ............. | 709/223 |
| 6,496,692 B1 * | 12/2002 | Shanahan .................... | 455/418 |
| 6,589,291 B1 * | 7/2003 | Boag et al. .................. | 715/513 |
| 6,678,518 B1 * | 1/2004 | Eerola ........................ | 455/422.1 |

FOREIGN PATENT DOCUMENTS

| | | |
|---|---|---|
| EP | 0 872 990 A1 | 10/1998 |
| JP | 11-136394 | 5/1999 |
| JP | 11-250009 | 9/1999 |
| JP | 11-306067 | 11/1999 |
| JP | 11-328075 | 11/1999 |
| JP | 11-338791 | 12/1999 |
| WO | 98/15091 | 4/1998 |
| WO | 98/33130 | 7/1998 |
| WO | 98/47270 | 10/1998 |

(Continued)

OTHER PUBLICATIONS

Mobile Media Magazine, vol. 6, No. 10, Sep. 13, 1998 pp. 66-67.

(Continued)

*Primary Examiner*—John Follansbee
*Assistant Examiner*—Haresh Patel
(74) *Attorney, Agent, or Firm*—Young & Thompson

(57) ABSTRACT

In a data conversion system, a WSP request for obtaining WWW contents of a Web server is sent from a terminal device to a WAP proxy and constraint information of images of the terminal device is added to header information of the request. Upon reception of the constraint information, the WAP proxy converts the WWW contents obtained from the Web server into data based on the constraint information, so that the WWW contents converted into the data are transmitted to the terminal device.

13 Claims, 4 Drawing Sheets

FOREIGN PATENT DOCUMENTS

| | | |
|---|---|---|
| WO | WO 9847270 A2 | 10/1998 |
| WO | WO 9847270 A3 | 10/1998 |
| WO | WO 9962036 | 12/1999 |

OTHER PUBLICATIONS

Nikkei Electronics, No. 694 Jul. 14, 1997, (No. 694), pp. 200-201.

* cited by examiner

DATA CONVERSION SYSTEM AND DATA CONVERSION METHOD FOR CONVERTING WEB CONTENT FOR PORTABLE DEVICES BASED ON THE CONTRAINTS OF THE PORTABLE DEVICE

BACKGROUND OF THE INVENTION

1. Field of the Invention

The present invention relates to a data conversion system and a data conversion method thereof and, more particularly, to a data conversion system adopted in a system for accessing the Internet from a portable information terminal based on WAP (Wireless Application Protocol) and a data conversion method thereof.

2. Description of the Related Art

System for accessing the Internet from a portable information terminal based on WAP is composed of a portable information terminal, a WAP proxy as a relay point between a wireless network and the Internet, a content filter for converting WWW (World Wide Web) contents into WAP contents and a Web server for providing WWW contents or WAP contents. When the portable information terminal makes a request for obtaining contents on the Web server, the contents on the Web server are obtained through the WAP proxy, and when the contents are WWW contents, they are converted into WAP contents by the content filter and then transmitted to the portable information terminal.

The conventional technique, however, has the following problems. The first problem is that conversion of contents by the content filter is not appropriate. In a case of such contents having a large volume of information as image data not directed to a portable information terminal, simply converting the format of the image data is not enough to enable a portable information terminal having a limited display capacity to use the data. Although it is possible to specify a portable information terminal to fixedly convert an image into an image optimum to the terminal, it is impossible in this case to cope with portable information terminals having different performances. The reason is that the contents filter is capable of conducting only fixed contents conversion processing.

The second problem is that in a case where appropriate contents need to be provided according to a client of a desktop personal computer, a portable information terminal and the like, it is necessary to prepare contents according to performance of each client such as a display capacity. The reason is that on the side of the WAP proxy and the Web server, automatic conversion of the contents using client information such as a display capacity is not possible.

On the other hand, one example of techniques of converting contents having a large volume of information into that appropriate for the portable information terminal is disclosed in Japanese Patent Laying-Open (Kokai) No. Heisei 11-250009 (hereinafter referred to as Literature 1). The technique disclosed in Literature 1 is directed to provision of Internet services enabling access to Web data with ease under mobile environments by obtaining page data from an Internet Web server in response to a request from each terminal device, based on resource information of a terminal device as a transfer destination, converting the obtained page data into data adapted to the terminal device in question and transferring the converted page data to the terminal device.

According to the technique recited in Literature 1, the Internet Web server converts data into data adapted to a terminal device based on resource information from the terminal device. According to the technique disclosed in Literature 1, accordingly, resource information is defined as fixed information upon connection of the terminal device to an Internet service provider (ISP) and the fixed resource information is adopted when resources on the Web server are to be designated (URL: Uniform Resource Locator). Therefore, even when a resource is designated on other Web server thereafter, the formerly adopted resource information will be adopted to make change of resource information difficult.

Unlike the technique disclosed in Literature 1, the present invention provides a technique enabling data conversion with resource data changed for each of various Web servers. Then, ease of updating of resource information enables suitable adjustment of communication traffic to adjust responsiveness at the connection of the Internet. Although other examples of techniques of this kind are disclosed also in Japanese Patent Laying-Open (Kokai) No. Heisei 11-306067 (hereinafter referred to as Literature 2) and Japanese Patent Laying-Open No. 11-328075 (hereinafter referred to as Literature 3), means for solving the above-described problems is disclosed neither in Literature 2 nor in Literature 3.

SUMMARY OF THE INVENTION

An object of the present invention is to provide a data conversion system which enables data conversion adapted to a terminal device and in which a server device needs not hold data conversion information for each terminal device in advance and a data conversion method thereof.

According to the first aspect of the invention, a data conversion system including a terminal device belonging to a first communication network, a server device belonging to a second communication network having a protocol different from that of the first communication network and a protocol conversion device provided at a connection point between the first communication network and the second communication network for conducting protocol conversion, comprises data conversion means for receiving constraint information peculiar to the terminal device added to a request from the terminal device for obtaining predetermined contents from the server device and converting predetermined contents obtained from the server device into data based on the constraint information.

According to the present invention, a request to be transmitted from a terminal device to a protocol conversion device includes constraint information based on which information the protocol conversion device converts predetermined contents obtained from a server device into contents adapted to the terminal device. The converted contents are transmitted to the terminal device.

In the preferred construction, the data conversion means determines whether predetermined contents obtained from the server device are image data or not and when the predetermined contents are image data, converts the predetermined contents into data based on the constraint information.

In another preferred construction, the data conversion means is provided at the protocol conversion device.

In another preferred construction, the data conversion system further comprises storage means for storing the constraint information from the terminal device, wherein the data conversion means converts predetermined contents obtained from the server device based on the constraint information stored in the storage means.

In another preferred construction, the protocol conversion device includes the data conversion means and storage means for storing the constraint information from the terminal device, the data conversion means converting predetermined contents obtained from the server device based on the constraint information stored in the storage means.

In another preferred construction, the data conversion means is provided at the server device.

In another preferred construction, the protocol conversion device transmits the request received from the terminal device and the constraint information added to the request to the server device, and the server device includes storage means for storing the constraint information from the protocol conversion device and the data conversion means for converting the predetermined contents based on the constraint information stored in the storage means.

In another preferred construction, the constraint information includes at least one of size information of images and gradation information of images.

In another preferred construction, the first communication network is a communication network for portable information terminals and the second communication network is the Internet.

According to the second aspect of the invention, a data conversion method in a data conversion system including a terminal device belonging to a first communication network, a server device belonging to a second communication network having a protocol different from that of the first communication network and a protocol conversion device provided at a connection point between the first communication network and the second communication network for conducting protocol conversion, comprising the steps of:

adding constraint information peculiar to the terminal device to a request from the terminal device for obtaining predetermined contents from the server device and transmitting the obtained request to the protocol conversion device, and receiving the constraint information from the terminal device to convert predetermined contents obtained from the server device into data based on the constraint information.

In the preferred construction, the data conversion step includes the steps of:

determining whether predetermined contents obtained from the server device are image data or not, and when the predetermined contents are image data, converting the predetermined contents into data based on the constraint information.

In another preferred construction, the constraint information includes at least one of size information of images and gradation information of images.

In another preferred construction, the first communication network is a communication network for portable information terminals and the second communication network is the Internet.

According to another aspect of the invention, a computer readable memory which stores a data conversion program for executing data conversion in a data conversion system including a terminal device belonging to a first communication network, a server device belonging to a second communication network having a protocol different from that of the first communication network and a protocol conversion device provided at a connection point between the first communication network and the second communication network for conducting protocol conversion, the data conversion program comprising the steps of:

adding constraint information peculiar to the terminal device to a request from the terminal device for obtaining predetermined contents from the server device and transmitting the obtained request to the protocol conversion device, and receiving the constraint information from the terminal device to convert predetermined contents obtained from the server device into data based on the constraint information.

According to a further aspect of the invention, a data conversion system including a terminal device belonging to a first communication network, a server device belonging to a second communication network having a protocol different from that of the first communication network and a protocol conversion device provided at a connection point between the first communication network and the second communication network for conducting protocol conversion, comprises data conversion unit which receives constraint information peculiar to the terminal device added to a request from the terminal device for obtaining predetermined contents from the server device and converts predetermined contents obtained from the server device into data based on the constraint information.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENTS

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

First, outline of the present invention will be described. The present invention provides a structure enabling, in processing of converting contents from WWW to WAP conducted at the time of access to WWW contents on the Internet from a portable information terminal adapted to WAP through a WAP proxy, conversion of image data having a large volume of information into image data of a size appropriate for the portable information terminal based on information provided from the portable information terminal.

Figure 1:
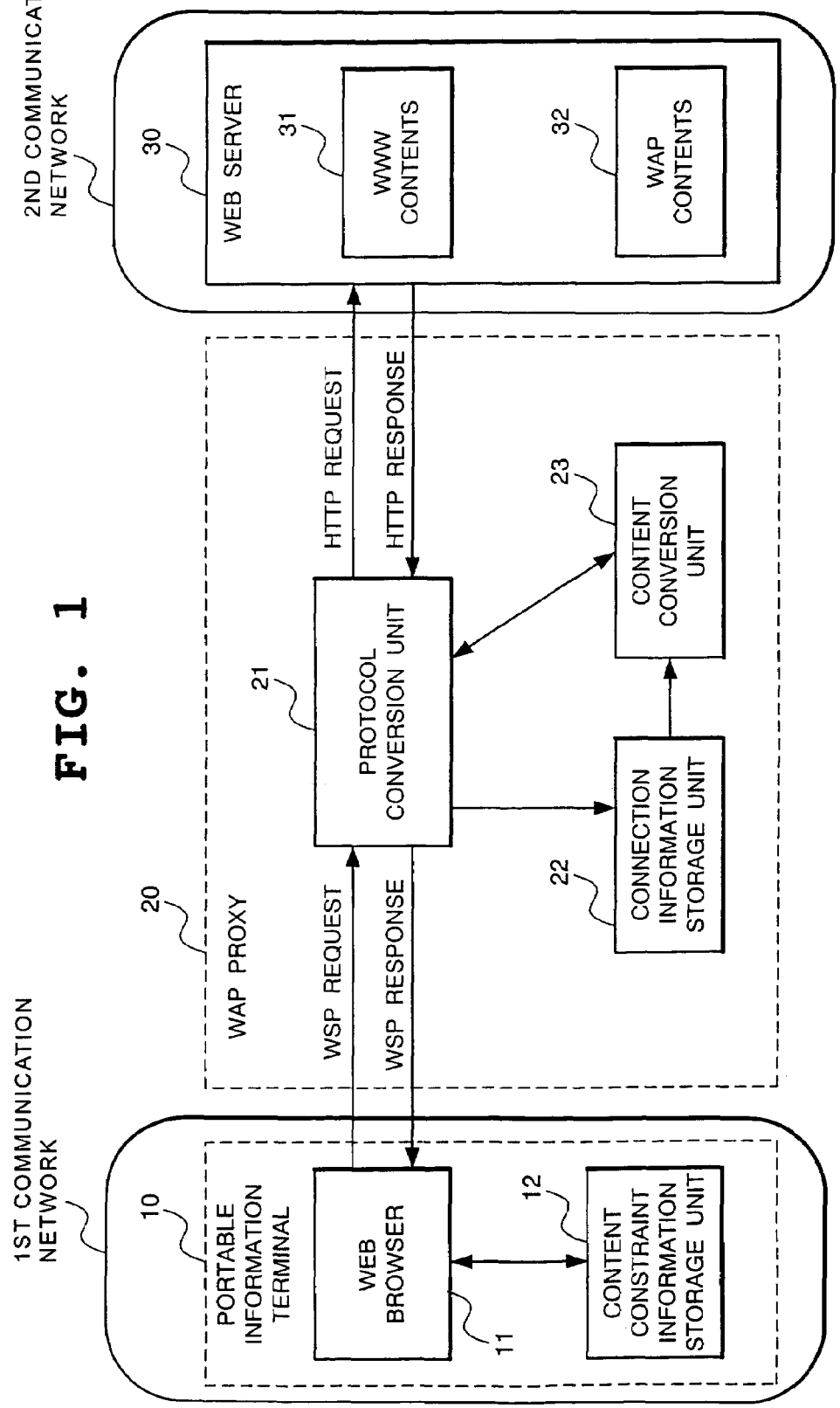
FIG. 1 is a diagram showing a structure of a data conversion system according to a first embodiment of the present invention.

In FIG. 1, a content constraint information storage unit 12 stores constraint information of image data usable at a portable information terminal 10. Among the constraint information are "size of image" and "gradation of image" that the portable information terminal 10 can handle, all of which can be set by a Web browser 11. The contents designated by the constraint information need not be equal to a physical display capacity of the portable information terminal 10. For example, even when the portable information terminal 10 is capable of displaying an image of a 16-gradation gray scale having 100 pixels in width and 80 pixels in height, the constraint information can be set to designate "50 pixels in width and 40 pixels in height" and "black and white binary values". The constraint information is stored in a connection information storage unit 22 in a WAP proxy 20 through a WSP (Wireless Session Protocol) request issued from the Web browser 11 at the time of obtaining the contents on a Web server 30 on the Internet.

When the WAP proxy 20 receives an HTTP (Hyper Text Transfer Protocol) response including WWW contents 31 not created for WAP (that is, for the portable information terminal 10) from the Web server 30, the WWW contents 31 are converted into WAP contents at a content conversion unit 23. At this time, with reference to constraint information of image data of the portable information terminal 10 stored in the connection information storage unit 22, the unit 23 converts the image contents into those of a size appropriate for the portable information terminal 10. The HTTP response including the converted contents is converted into a WSP response at the protocol conversion unit 23 and returned to the Web browser 11.

Thus converting image data having a large volume of information into that appropriate for the portable information terminal 10 adapted to WAP at the time of access from the portable information terminal 10 to the existing WWW contents 31 realizes easy Web access environments.

In the following, embodiments of the present invention will be described with reference to the accompanying drawings. FIG. 1 is a diagram showing a structure of a first embodiment of a data conversion system according to the present invention. With reference to FIG. 1, the data conversion system includes the portable information terminal 10 having the Web access function based on WAP such as a portable telephone, the WAP proxy 20 as a connection point between a wireless network to which the portable information terminal 10 belongs and the Internet, and the Web server 30 existing on the Internet for providing various contents.

The portable information terminal 10 includes the Web browser 11 and the content constraint information storage unit 12. The Web browser 11 is an interface for accessing contents on the Web server 30 existing on the Internet. The Web browser 11 is also an interface for setting constraint information of image data handled by the portable information terminal 10.

As constraint information of image data, "size of image" and "gradation of image" can be set. "Size of image" is the maximum size of images allowed to be displayed on the portable information terminal 10 and is designated by vertical and lateral pixel values of an image. "Gradation of image" is gradation information of an image allowed to be displayed by the portable information terminal 10, by which such information is set as black and white binary values, a gray scale of N (N: positive integer) gradations and N colors.

These information elements only need to fall within a range of a physical display capacity that the portable information terminal 10 has.

Constraint information of image data is set as one of header information in a WSP request that is issued at the time of access to WWW contents on the Internet. The content constraint information storage unit 12 is a storage region for storing constraint information of images designated by the Web browser.

The WAP proxy 20 includes a protocol conversion unit 21, the connection information storage unit 22 and the content conversion unit 23. The WAP proxy 20 is a point for providing connection environments between the wireless network and the Internet and manages a connection with the portable information terminal 10 and a connection with the Web server 30.

The protocol conversion unit 21 conducts conversion from a WSP request to an HTTP request and conversion from an HTTP response to a WSP response. The protocol conversion unit 21, when at the reception of a WSP request, constraint information of image data related to the portable information terminal 10 and information about a type of WAP contents supported by the portable information terminal 10 are included in the header part of the WSP request, preserves these contents in the connection information storage unit 22. At the reception of an HTTP response, the protocol conversion unit 21 transfers a content of the contents and information stored in the connection storage unit 22 to the content conversion unit 23.

The connection information storage unit 22 receives constraint information of images related to the portable information terminal 10 and type information of WAP contents supported by the portable information terminal 10 from the protocol conversion unit 21 and manages the information for each connection.

The content conversion unit 23, when the contents received from the protocol conversion unit 21 are WWW contents, converts them into WAP contents. Then, when the contents are image data, making use of the constraint information of images preserved in the connection information storage unit 22, the unit 23 conducts size conversion and gradation conversion of the image data and returns the converted contents to the protocol conversion unit 21.

The Web server 30 provides various contents on the Internet. Among the contents to be provided are the WWW contents 31 created for the existing Internet and WAP contents 32 created for the portable information terminal 10.

Figure 2:
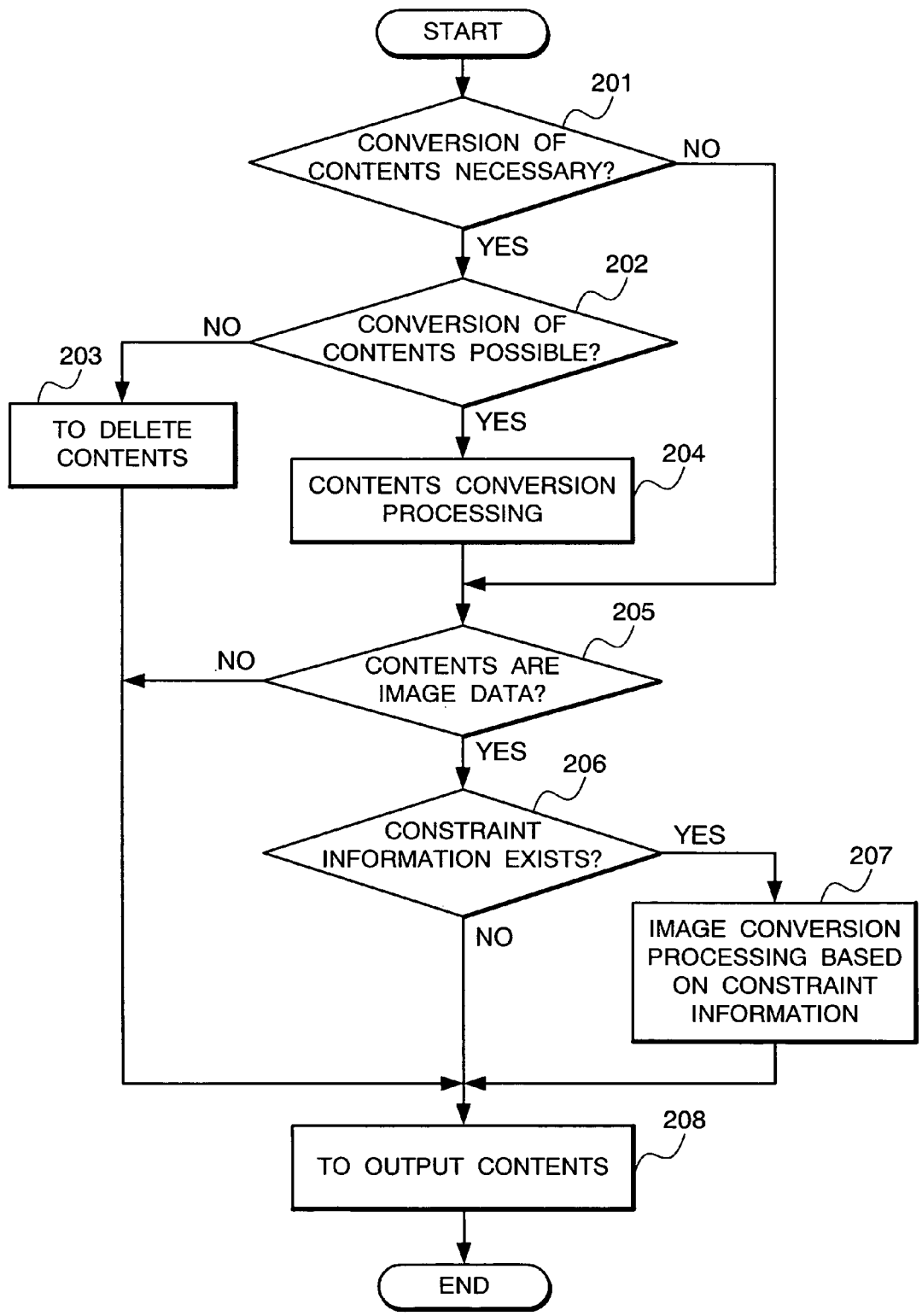
FIG. 2 is a flow chart showing operation of the first embodiment.

Next, operation as a whole of the first embodiment will be detailed with reference to FIGS. 1 and 2. FIG. 2 is a flow chart showing operation of the first embodiment. "Size of image" and "gradation of image" as constraint information of images in the portable information terminal 10 are stored in the content constraint information storage unit 12 through the Web browser 11. Upon instruction to obtain the WWW contents 31 on the Web server 30 made by the Web browser 11, a WSP request for establishing a connection between the portable information terminal 10 and the WAP proxy 20 is transmitted to the WAP proxy 20.

As header information of the WSP request, constraint information of images of the portable information terminal 10 is set together with information such as a type of WAP contents supported by the portable information terminal 10. Upon establishment of a connection, the type information of the WAP contents supported by the portable information terminal 10 and the constraint information of images are preserved from the protocol conversion unit 21 to the connection information storage unit 22 in the WAP proxy 20 for each connection (i.e. for each Web server accessed), so that a WSP response indicative of establishment of the connection is returned to the portable information terminal 10.

Next, the portable information terminal 10 transmits a WSP request for obtaining the WWW contents 31 to the WAP proxy 20. The WSP request is converted into an HTTP request at the protocol conversion unit 21 and the HTTP request is transmitted to the Web server 30 after the WAP proxy 20 succeeds in establishing a connection with the Web server 30.

The Web server 30 returns an HTTP response including the WWW contents 31 whose acquisition is requested in its data part to the WAP proxy 20. The protocol conversion unit 21 of the WAP proxy 20 having received the HTTP response transfers the contents included in the data part of the HTTP response to the content conversion unit 23 together with the information included in the connection information storage unit 22.

The content conversion unit 23 checks a type of the received contents to determine whether conversion of the contents is necessary or not (that is, whether they are WAP contents supported by the portable information terminal 10 or not) and whether conversion to appropriate WAP contents is possible or not (Steps 201 and 202 of FIG. 2). In a case where conversion of the contents is necessary ("yes" at Step 201) but conversion to the WAP contents supported by the portable information terminal 10 is impossible ("no" at Step 202), delete the contents (Step 203) and return the same to the protocol conversion unit 21 (Step 208).

On the other hand, in a case where contents conversion is required ("yes" at Step 201) and conversion to the WAP contents supported by the portable information terminal 10 (e.g. conversion of HTML (Hyper Text Markup Language) to WML (Wireless Markup Language), conversion of an image format not supported by the portable information terminal 10 into an image format supported by the same) is possible ("yes" at Step 202), conduct processing of conversion to appropriate WAP contents (Step 204). When conversion of the contents is not necessary ("no" at Step 201), conduct none of processing.

Next, determination is made whether the WAP contents obtained by conversion at Step 204 or the WAP contents subjected to none of processing at Step 201 ("no" at Step 201) are image data (Step 205). When the WAP contents are not image data ("no" at Step 205), they are returned to the protocol conversion unit 21 without conversion (Step 208). On the other hand, when the WAP contents are image data ("yes" at Step 205), determination is made whether there exists constraint information or not (Step 206).

Then, when constraint information exits ("yes" at Step 206), the WAP contents are converted so as to satisfy the constraint information (Step 207) and WAP contents obtained as a result of the conversion are returned to the protocol conversion unit 21 (Step 208). On the other hand, when no constraint information exists ("no" at Step 206), the WAP contents are returned to the protocol conversion unit 21 without conversion (Step 208).

After converting all the data part in the HTTP response into WAP contents by means of the content conversion unit 23, the protocol conversion unit 21 converts the HTTP response to a WSP response and transmits the WSP response to the Web browser 11.

Figure 3:
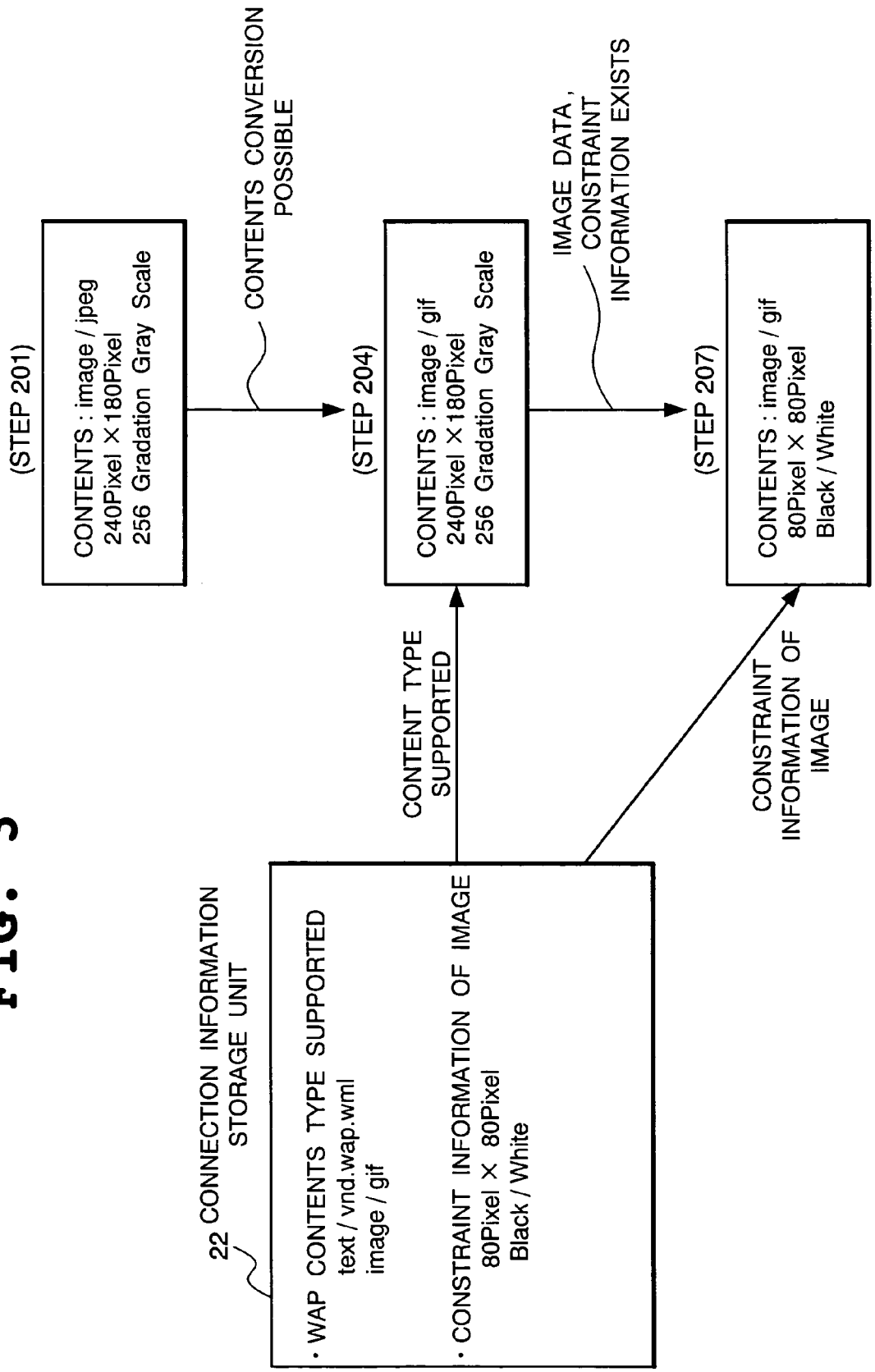
FIG. 3 is a schematic diagram showing specific operation of the first embodiment.

Next, operation of the first embodiment will be described with respect to a specific example. FIG. 3 is a schematic diagram showing specific operation of the first embodiment. As illustrated in the figure, assume, for example, that in the connection information storage unit 22, "type of contents supported by the portable information terminal 10" and "constraint information of image data in the portable information terminal 10" are preserved at the time of establishment of a connection between the portable information terminal 10 and the WAP proxy 20 and that while the connection exists, an HTTP response including JPEG (Joint Photographic Expert Group) images as contents is received from the Web server 30. Type of the contents in the HTTP response is a JPEG image (image/jpeg) and not supported by the portable information terminal 10, so that conversion of the contents is required ("yes" at Step 201).

On the other hand, since a GIF (Graphic Interchange Format) image (image/gif) is supported by the portable information terminal 10, when conversion from JPEG to GIF exists, determination is made that conversion of the contents is possible ("yes" at Step 202) to convert a JPEG image to a GIF image (Step 204). Moreover, since the contents are picture images ("yes" at Step 205), confirmation of existence/non-existence of constraint information related to the image data is made (Step 206). Since constraint information of the image data is registered at the connection information storage unit 22 ("yes" at Step 206), change an image size and gradation information so as to satisfy these constraint information (so as to fall within a size indicated in the constraint information and within a range of gradation information) (Step 207). The converted image data is returned to the protocol conversion unit 21 (Step 208). The protocol conversion unit 21 replaces the data received from the content conversion unit 23 with the contents in the HTTP response, converts the HTTP response into a WSP response and transmits the WSP response to the Web browser 11.

Figure 4:
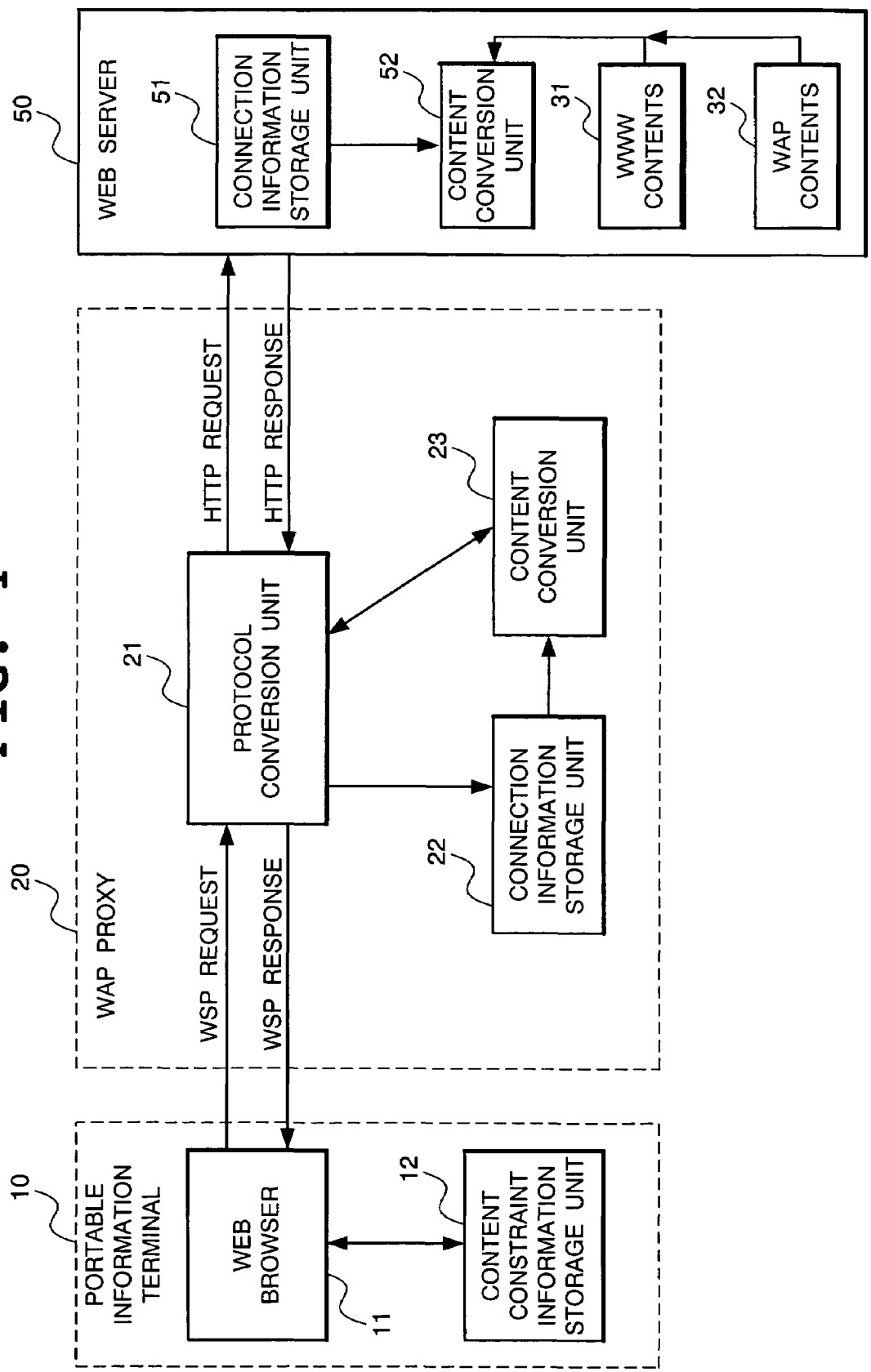
FIG. 4 is a diagram showing a structure of a second embodiment.

Next, second embodiment will be described. FIG. 4 is a diagram showing a structure of the second embodiment. In the figure, the same components as those of FIG. 1 are indicated by the same reference numerals to which no description is made here. With reference to the figure, the second embodiment is different from the first embodiment in that a Web server 50 includes a connection information storage unit 51 and a content conversion unit 52 in addition to the components of the Web server 30 shown in FIG. 1.

The connection information storage unit 51 is a part for storing information related to a connection between the WAP proxy 20 and the Web server 50 and similarly to the connection information storage unit 22, stores constraint information of image related to the portable information terminal 10 and type information of contents that the portable information terminal supports.

The content conversion unit 52 conducts conversion from WWW contents to WAP contents and conversion of image contents based on constraint information by making use of constraint information of images of the portable information terminal 10 and type information of contents that the portable information terminal supports all of which information is stored in the connection information storage unit 51. Conversion processing is conducted following the processing steps shown in FIG. 2 similarly to the content conversion unit 23.

Next, operation of the second embodiment will be detailed with reference to FIG. 4. Processing of setting up a connection between the portable information terminal 10 and the WAP proxy 20 upon instruction on acquisition of the WWW contents 31 on the Web server 50 by the Web browser 11 is the same as that of the first embodiment shown in FIG. 1.

In the processing of setting up a connection between the WAP proxy 20 and the Web server 50, the WAP proxy 20, at the time of transmitting an HTTP request for setting up a connection to the Web server 50, adds "WAP content type that the portable information terminal 10 supports" and "constraint information of images of the portable information terminal 10", preserved in the connection information storage unit 22 to a header of the HTTP request. The Web server 50 preserves these pieces of information in the connection information storage unit 51 at the time of setting-up of the connection and returns an HTTP response indicating that the connection is established to the WAP proxy.

When a WSP request for obtaining the WWW contents 31 is transmitted from the portable information terminal 10 to the WAP proxy 20, the request is converted into an HTTP request by the protocol conversion unit 21 of the WAP proxy 20 and transmitted to the Web server 50. In the Web server 50, the contents of the WWW contents 31 whose acquisition is requested and information stored in the connection information unit 51 are transferred to the content conversion unit 52. Contents conversion processing is conducted based on the processing steps shown in FIG. 2 in the same manner as that conducted by the content conversion unit 23 of the WAP proxy 20.

The WAP contents obtained as a result of the conversion processing are set at a data part of an HTTP response and transmitted to the WAP proxy 20. In the WAP proxy 20, no conversion processing is conducted in particular for the contents stored in the HTTP response and the HTTP response is converted into a WAP response at the protocol conversion unit 21 and transmitted to the portable information terminal 10.

By providing the specific Web server 50 with a contents conversion mechanism making use of constraint information of image data, the second embodiment produces new effects, distribution of load on contents conversion processing conducted at the WAP proxy 20 and reduction in communication traffic between the WAP proxy 20 and the Web server 50.

The data conversion method in a data conversion system including a terminal device belonging to a first communication network, a server device belonging to a second communication network having a protocol different from that of the first communication network and a protocol conversion device provided at a connection point between the first communication network and the second communication network for conducting protocol conversion according to the present embodiment can be realized not only by hardware but also by loading a computer program (data conversion program) having the respective functions into a memory of a computer processing device. The computer program is stored in a recording medium (reference number) such as a magnetic disk and a semiconductor memory. Then, by loading the program from the recording medium into the computer processing device to control operation of the computer processing device, each of the above-described functions is realized.

The present invention relates to a data conversion system including a terminal device belonging to a first communication network, a server device belonging to a second communication network having a protocol different from that of the first communication network and a protocol conversion device provided at a connection point between the first communication network and the second communication network for conducting protocol conversion, in which provided are a request transmission means for transmitting, from the terminal device to the protocol conversion device, a request for obtaining predetermined contents from the server device and constraint information peculiar to the terminal device so as to be contained in the request, and a data conversion means for receiving the constraint information from the terminal device to convert the predetermined contents obtained from the server device into data based on the constraint information, thereby realizing data conversion adapted to the terminal device and eliminating the need of the server device to hold data conversion information for each terminal device in advance.

According to another aspect, the present invention relates to a data conversion method in a data conversion system including a terminal device belonging to a first communication network, a server device belonging to a second communication network having a protocol different from that of the first communication network and a protocol conversion device provided at a connection point between the first communication network and the second communication network for conducting protocol conversion, which method includes a first step of transmitting, from the terminal device to the protocol conversion device, a request for obtaining predetermined contents from the server device and constraint information peculiar to the terminal device so as to be contained in the request, and a second step of receiving the constraint information from the terminal device to convert the predetermined contents obtained from the server device into data based on the constraint information to produce the same effect as that of the present invention described above.

More specifically, the first effect is that the volume of information to be transferred when a portable information terminal having rigid limitations of a display capacity accesses WWW contents including image data having a large volume of information can be reduced, thereby enabling easy Internet access from a portable information terminal. The reason is that by converting image data returned by a Web server based on constraint information of image data that a portable information terminal allows, image data appropriate to the portable information terminal can be obtained any time.

The second effect is eliminating the need of a provider of Web contents to prepare a plurality of Web contents such as "those for a portable terminal A", "those for a portable terminal B" and "those for a desktop personal computer". The reason is that with only one image data (for desktop personal computers) whose volume of information is the largest prepared, contents are automatically converted into appropriate images according to a portable information terminal for use.

In addition, according to the present invention, constraint information peculiar to a terminal device is transmitted from the terminal device to a predetermined server device through a protocol conversion device. The present invention therefore enables transmission of different pieces of constraint information from a terminal device to each server device. In other words, updating of resource information is easy, so that communication traffic can be suitably adjusted to adjust responsiveness at the time of a connection to the Internet.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A data conversion system, comprising:
a terminal device belonging to a first communication network;
a server device belonging to a second communication network having a protocol different from that of said first communication network;
a protocol conversion device provided at a connection point between said first communication network and said second communication network for conducting protocol conversion;
a storage unit which stores constraint information peculiar to said terminal device and type information of contents supported by said terminal device added to a request from said terminal device for obtaining contents from said server device; and
a data conversion unit which converts said contents obtained from said server device into data based on said type information of contents supported by said terminal and said constraint information peculiar to said terminal device stored in said storage unit,
wherein said data conversion unit determines whether conversion to contents supported by said terminal device is necessary and whether conversion of said contents obtained from said server device is possible based on said type information of contents supported by said terminal device,
when conversion of said contents obtained from said server device is necessary but conversion to the contents supported by said terminal device is impossible, said data conversion unit deletes said contents obtained from said server device,
when conversion of said contents obtained from said server device is necessary and conversion to the contents supported by said terminal device is possible, said data conversion unit converts said contents obtained from said service device to converted contents supported by said terminal device,
said data conversion unit determines whether one of the converted contents supported by said terminal device and said contents supported by said terminal device are image data,
when said one of said contents supported by said terminal device and said converted contents supported by said terminal device are not image data, said data conversion unit returns said one of said contents supported by said terminal device and said converted contents supported by said terminal device to said protocol conversion device without further conversion,
when said one of said contents supported by said terminal device and said converted contents supported by said terminal device are image data, said data conversion unit determines whether said constraint information peculiar to said terminal device exists in said storage unit,
when said constraint information peculiar to said terminal device exists, said data conversion unit converts said one of said contents supported by said terminal device and said converted contents supported by said terminal device to converted image contents based on said constraint information peculiar to said terminal device and returns said converted image contents to said protocol conversion device,
when no constraint information peculiar to said terminal device exists, said data conversion unit returns said one of said contents supported by said terminal device and said converted contents supported by said terminal device to said protocol conversion device without conversion.

2. The data conversion system as set forth in claim 1, wherein
said data conversion unit is provided at said protocol conversion device.

3. The data conversion system as set forth in claim 1, wherein
said protocol conversion device includes said data conversion unit and said storage unit.

4. The data conversion system as set forth in claim 1, wherein
said data conversion unit is provided at said server device.

5. The data conversion system as set forth in claim 1, wherein
said protocol conversion device transmits said request received from said terminal device and said constraint information peculiar to said terminal device and said type information of contents supported by said terminal device added to said request to said server device, and
said protocol conversion device and said server device include said storage unit and said data conversion unit.

6. The data conversion system as set forth in claim 1, wherein
said constraint information peculiar to said terminal device includes at least one of size information of images and gradation information of images.

7. The data conversion system as set forth in claim 1, wherein
said first communication network is a communication network for portable information terminals and said second communication network is the Internet.

8. A data conversion method in a data conversion system including a terminal device belonging to a first communication network, a server device belonging to a second communication network having a protocol different from that of said first communication network and a protocol conversion device provided at a connection point between said first communication network and said second communication network for conducting protocol conversion, comprising the steps of:
storing constraint information peculiar to said terminal device and type information of contents supported by said terminal device added to a request from said terminal device for obtaining contents from said server device;
determining whether conversion to contents supported by said terminal device of said contents obtained from said server device is necessary and whether conversion of said contents obtained from said server device is possible based on said type of information of contents supported by said terminal device;
deleting said contents obtained from said server device, when conversion of said contents obtained from said server device is necessary, but conversion to the contents supported by said terminal device is impossible;
converting the contents supported by said terminal device to converted contents, when conversion of said contents obtained from said server device is necessary and conversion to the contents supported by said terminal device is possible;

determining whether one of the converted contents and said contents supported by said terminal device are image data;

returning said one of said contents supported by said terminal device and said converted contents to said protocol conversion device without conversion based on said constraint information peculiar to said terminal device, when said one of said contents supported by said terminal device and said converted contents are not image data;

determining whether said constraint information exists in said storage unit, when said one of said contents supported by said terminal device and said converted contents are image data;

converting said one of said contents supported by said terminal device and said converted contents based on said constraint information peculiar to said terminal device to converted image contents and returning said converted image contents to said protocol conversion device, when said constraint information peculiar to said terminal device exists; and returning said one of said contents supported by said terminal device and said converted contents to said protocol conversion device without conversion, when no constraint information peculiar to said terminal device exists.

9. The data conversion method as set forth in claim 8, wherein said constraint information peculiar to said terminal device includes at least one of size information of images and gradation information of images.

10. The data conversion method as set forth in claim 8, wherein said first communication network is a communication network for portable information terminals and said second communication network is the Internet.

11. A computer readable memory which stores a data conversion program for executing data conversion in a data conversion system including a terminal device belonging to a first communication network, a server device belonging to a second communication network having a protocol different from that of said first communication network and a protocol conversion device provided at a connection point between said first communication network and said second communication network for conducting protocol conversion, said data conversion program comprising the functions of:

storing constraint information peculiar to said terminal device and type information of contents supported by said terminal device added to a request from said terminal device for obtaining contents from said server device;

determining whether conversion to contents supported by said terminal device of said contents obtained from said server device is necessary and whether conversion of said contents obtained from said server device is possible based on said type information of contents supported by said terminal device;

deleting said contents obtained from said server device, when conversion of said contents obtained from said server device is necessary, but conversion to the contents supported by said terminal device is impossible;

converting the contents supported by said terminal device to converted contents, when conversion of said contents obtained from said server device is necessary and conversion to the contents supported by said terminal device is possible;

determining whether one of the converted contents and said contents supported by said terminal device are image data;

returning said one of said contents supported by said terminal device and said converted contents to said protocol conversion device without conversion based on said constraint information, when said one of said contents supported by said terminal device and said converted contents are not image data;

determining whether said constraint information peculiar to said terminal device exists in said storage unit, when said one of said contents supported by said terminal device and said converted contents are image data;

converting said one of said contents supported by said terminal device and said converted contents based on said constraint information peculiar to said terminal device to converted image contents and returning said converted image contents to said protocol conversion device, when said constraint information peculiar to said terminal device exists; and returning said one of said contents supported by said terminal device and said converted contents to said protocol conversion device without conversion, when no constraint information peculiar to said terminal device exists.

12. The computer readable memory which stores a data conversion program as set forth in claim 11, wherein said constraint information peculiar to said terminal device includes at least one of size information of images and gradation information of images.

13. The computer readable memory which stores a data conversion program as set forth in claim 11, wherein said first communication network is a communication network for portable information terminals and said second communication network is the Internet.

* * * * *